United States Patent [19]

Goldsworthy et al.

[11] 4,177,029
[45] Dec. 4, 1979

[54] APPARATUS FOR CONTINUOUSLY FABRICATING THREE-DIMENSIONAL FILAMENT REINFORCED FOAM INSULATION

[75] Inventors: William B. Goldsworthy, Palos Verdes, Calif.; Harald E. Karlson, Eugene, Oreg.

[73] Assignee: McDonnell Douglas Corporation, Long Beach, Calif.

[21] Appl. No.: 847,238

[22] Filed: Oct. 31, 1977

Related U.S. Application Data

[60] Division of Ser. No. 669,819, Mar. 24, 1976, Pat. No. 4,079,106, which is a continuation of Ser. No. 516,412, Oct. 21, 1974, abandoned.

[51] Int. Cl.$^2$ ............................................. B29D 27/04
[52] U.S. Cl. .................................. 425/112; 425/115; 425/224; 425/817 C
[58] Field of Search ................ 156/79; 264/46.2, 46.5; 425/4 C, 817 C, 112, 115, 505, 224, 329, 371, DIG. 38

[56] References Cited

U.S. PATENT DOCUMENTS

| | | | |
|---|---|---|---|
| 3,322,868 | 5/1967 | Kruse et al. | 264/46.5 |
| 4,025,257 | 5/1977 | Sagane et al. | 425/115 |

*Primary Examiner*—Mark Rosenbaum
*Attorney, Agent, or Firm*—Max Geldin; Walter J. Jason; John P. Scholl

[57] ABSTRACT

A method and apparatus for continuously fabricating three-dimensional (3D) filament reinforced foam insulation slabs. Rows of X or longitudinal filaments are fed longitudinally into a machine in spaced, stacked horizontal planes. Rows of Y or transverse filaments are fed transversely into the machine in spaced, stacked horizontal planes. Z or vertical filaments are fabricated into units of four vertical spaced lengths of strands which fit into each of the vertical column squares formed by the X-Y filaments to form the continuous X-Y-Z orthogonal array. Urethane or equivalent foam is discharged onto a moving belt beneath the filamentary array which is moved in the same direction and at the same rate as the belt carrying the foam. The foam material froths or foams upwardly through the filamentary array as they move along to the next station for curing. After sufficient cure, the foamed array is cut from the frames and into desired length, forming planks.

6 Claims, 9 Drawing Figures

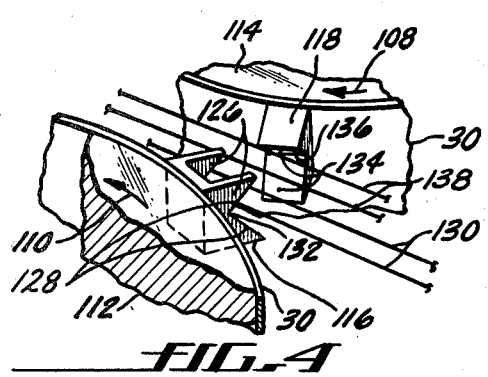
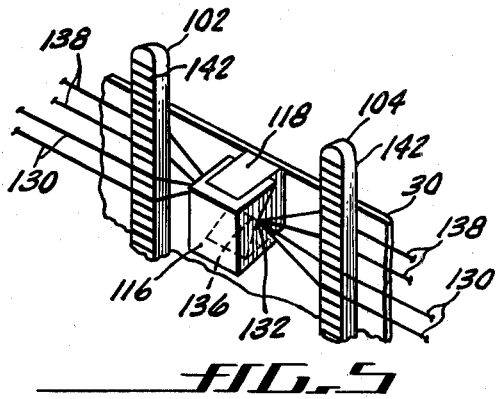
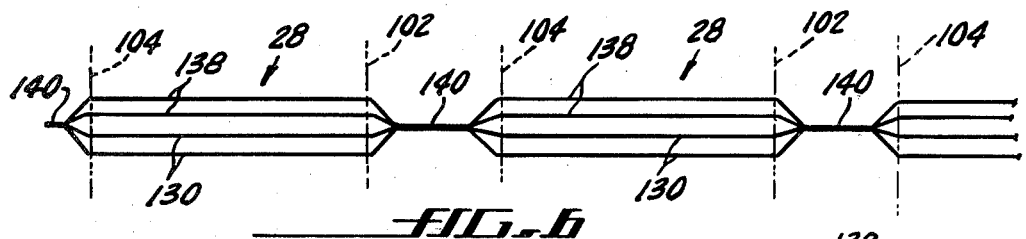
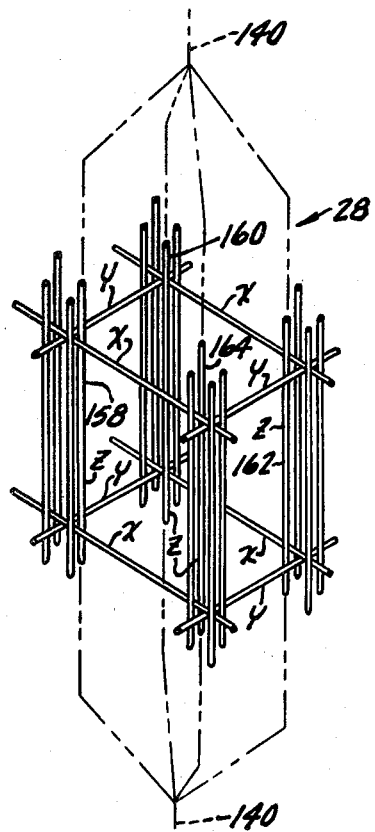
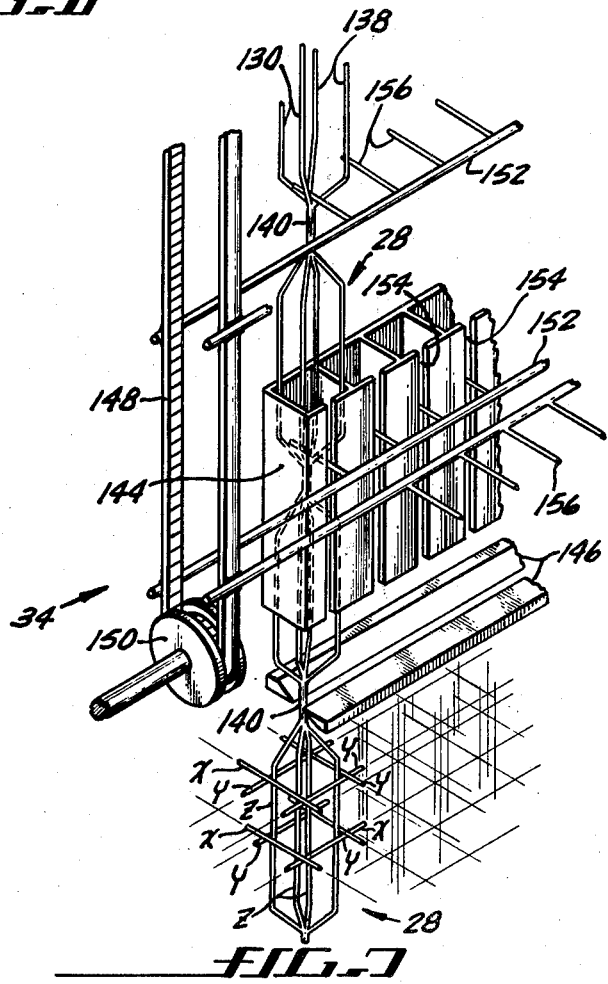

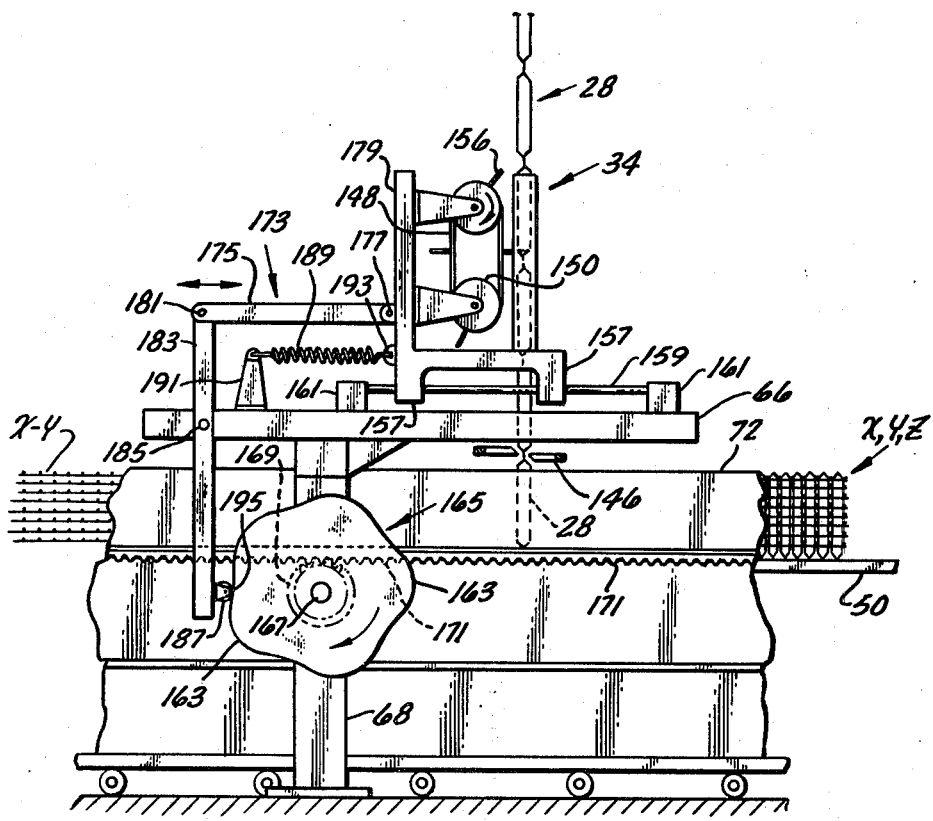
FIG._7A

APPARATUS FOR CONTINUOUSLY FABRICATING THREE-DIMENSIONAL FILAMENT REINFORCED FOAM INSULATION

This is a division of application Ser. No. 669,819, filed Mar. 24, 1976, now U.S. Pat. No. 4,079,106, which is a continuation-in-part of application Ser. No. 516,412, filed Oct. 21 1974, now abandoned.

BACKGROUND OF THE PRESENT INVENTION

Urethane foam that is orthogonally reinforced with filaments is an effective cryogenic insulation. One use of such insulation is in insulating compartments or holds of marine vessels used to transport liquid natural gas. Transporting natural gas in its liquid state (at cryogenic temperatures) is preferable to transporting it in its gaseous state since it is reduced in volume approximately 600 times.

In one form, a metal storage tank is spaced from the hull of the vessel and insulation is applied to the inside of the tank. The Z fibers in the foam insulation planks are bonded to sheets of plywood bolted to the tank, or the fibers may be bonded directly to the tank inner walls. The layered X-Y fibers of adjacent planks are bonded together to form a unitary contiguous insulation blanket that serves to contain the liquid natural gas.

Heretofore, 3D reinforced foam insulation was made in block form in intermittent steps. One such method is disclosed in U.S. Pat. No. 3,778,492 which issued to C. R. Lemons on Dec. 11, 1973 for Fabrication of Three-Dimensional Reinforced Foam Insulation Blocks. By this method, reinforcing filaments are attached to cardboard frames or strips which are subsequently stacked and arranged over a pan in which the raw foam batter is placed. The foam then rises through the filamentary array. After the foam is cured, the cardboard is cut away (and discarded) and the remaining foam block is bonded to similar blocks when used as an insulation material. The non-productive cardboard frames and the batch process method of arraying the filaments and foaming are expensive, time-consuming and wasteful of material.

U.S. Pat. No. 3,972,554 to Muskat et al, discloses a continuous method of producing fiber reinforced foam pads by impregnating batts of randomly arranged fibers with resin. Disclosures of a similar nature are found in U.S. Pat. Nos. 3,273,978 to Paul and 3,867,494 to Rood, the latter patent disclosing orientation of the fibers in layers. In the latter case, the fibers have a tendency to deteriorate or exfoliate along the planes of reinforcement.

However none of the above patents teaches continuous production of a foamed array of reinforcing fibers which are oriented in the X, Y and Z direction according to the present invention.

SUMMARY OF THE PRESENT INVENTION

In accordance with the present invention an apparatus is provided for constructing an X-Y-Z reinforced multi-layered array of filaments which is embedded in foam insulation in a continuous process. The resulting insulation planks preferably are of a specific width (24 inches) and thickness (4, 6 or 8 inches) but are of an infinite length. Present practice employed in using the invention is to cut the infinite length, endless insulation plank output into 10 foot lengths to facilitate handling, shipping and ultimate installation.

The apparatus includes a machine for feeding X filaments longitudinally and Y filaments transversely along a path of travel for each desired layer of filament reinforcement. The Y filaments may be held between tenter hooks, clips, or pins mounted on channel-like plates which ride on side rails for the length of the machine. Other Y filament retention apparatus may be substituted, if desired. The Y filaments may be above or below or alternated above and below the X filaments for each or any discrete layer. The X and Y filaments may or may not be attached at their cross-over points.

The Z filaments are continuously fabricated in long chains on an integral, auxiliary portion of the machine. These filaments are lengths of initially parallel strands held a discrete distance apart, then, at discrete intervals, brought together for bonding or otherwise attaching the impregnated or pre-impregnated filaments together to form alternate grouped and spaced segments or bundles of strands, and subsequently cured. These units of Z filaments are then machine-inserted into the vertically stacked squares formed by the X-Y filaments to form the X-Y-Z orthogonal array. Preferably, each X-Y grid has $\frac{3}{8}$ inch openings and the grids are vertically spaced $\frac{3}{8}$ inch apart. In other embodiments, the width, thickness and length of the planks may be varied as well as the size of the grid openings and their vertical spacing.

A standard mixing and metering machine is used to meter and mix the urethane or equivalent foam correctly and to discharge it onto a moving belt beneath the filamentary array. Both the array and belt supporting the foaming material move in the same direction and at the same rate. The lower moving belt of foam is then brought into close proximity to the filamentary array, and the foam material froths upwardly through the filamentary array.

Sufficient distance is incorporated in the length of the belts or chains to insure sufficient curing of the foamed array to permit cutting and subsequent handling. Vents for the removal of volatiles, and heaters or cooling means to control cure may be incorporated in conjunction with this portion of the machine. After sufficient cure, the foamed array is cut from the tenter frames, chains, or belts, and cut to the approximate desired length.

The tenter frames, chains, and belts are then cleaned, mechanically or with heat or solvents, coated with a wax or an equivalent release agent, and automatically returned to the initial portion of the machine. The process is therefore continuous and automatic.

BRIEF DESCRIPTION OF THE DRAWINGS

FIG. 4 is a fragmentary, pictorial representation of means on the endless belts for engaging the Z strands to bring them together at spaced intervals;

FIG. 5 is a fragmentary pictorial representation of the means in FIG. 4 gripping the strands between the separation strips to bring them together;

FIG. 6 is a pictorial representation of continuous Z strands forming alternately grouped and spaced apart segments;

FIG. 7 is a partially schematic, pictorial illustration of apparatus for inserting the Z strand segments into the X-Y array;

FIG. 7a shows apparatus for moving the Z insertion apparatus of FIG. 7 longitudinally during longitudinal movement of the X-Y array; and FIG. 8 is an isometric fragmentary view of a typical three-dimensional filamentary array prior to the foaming operation.

DETAILED DESCRIPTION OF ILLUSTRATIVE EMBODIMENT

A typical three-dimensional reinforced insulation plank is 24 inches wide and four inches, six inches, or eight inches thick. Although formed into a plank of continuous infinite length, it is usually cut into ten-foot lengths for handling. In one example, layers of X oriented fibers extend longitudinally throughout the plank length, with the fibers spaced ⅜ inch apart. Layers of Y oriented fibers extend transversely across the width with the fibers spaced ⅜ inch apart. A layer of X and a layer of Y fibers (X and Y denoted longitudinal and transverse directions) form a grid of ⅜ inch squares. A plurality of such grids are vertically spaced over each other and also ⅜ inch apart. This forms vertically stacked X-Y squares into which one or more vertical or Z oriented fibers is inserted to form an X-Y-Z orthogonal array. Preferably the fibers are bonded together at their cross-over points of contact. If the fibers have been pre-impregnated, i.e., coated with a resin, the bonding may be accomplished by simply heating at about 180° F. for 10 to 15 seconds. If the fibers have not been previously coated, they might be sprayed or dipped into a resin after the array has been formed, and then heated to bond the fibers together where they contact each other.

After the X-Y-Z array has been formed, a urethane or equivalent formable material is then foamed through the array to embed or encapsulate it within the foamy material. When the foaming action has been completed and the resultant material solidified or cured so it can be handled, the material is cut from the apparatus holding the array in place, and then cut into planks for convenient handling, shipping, and installing for use. These three-dimensionally reinforced insulation planks, as well as certain apparatus used in their fabrication, form the subject matter of other inventions whereas the present invention is concerned with the apparatus exemplified as set forth hereinafter.

Figure 1:
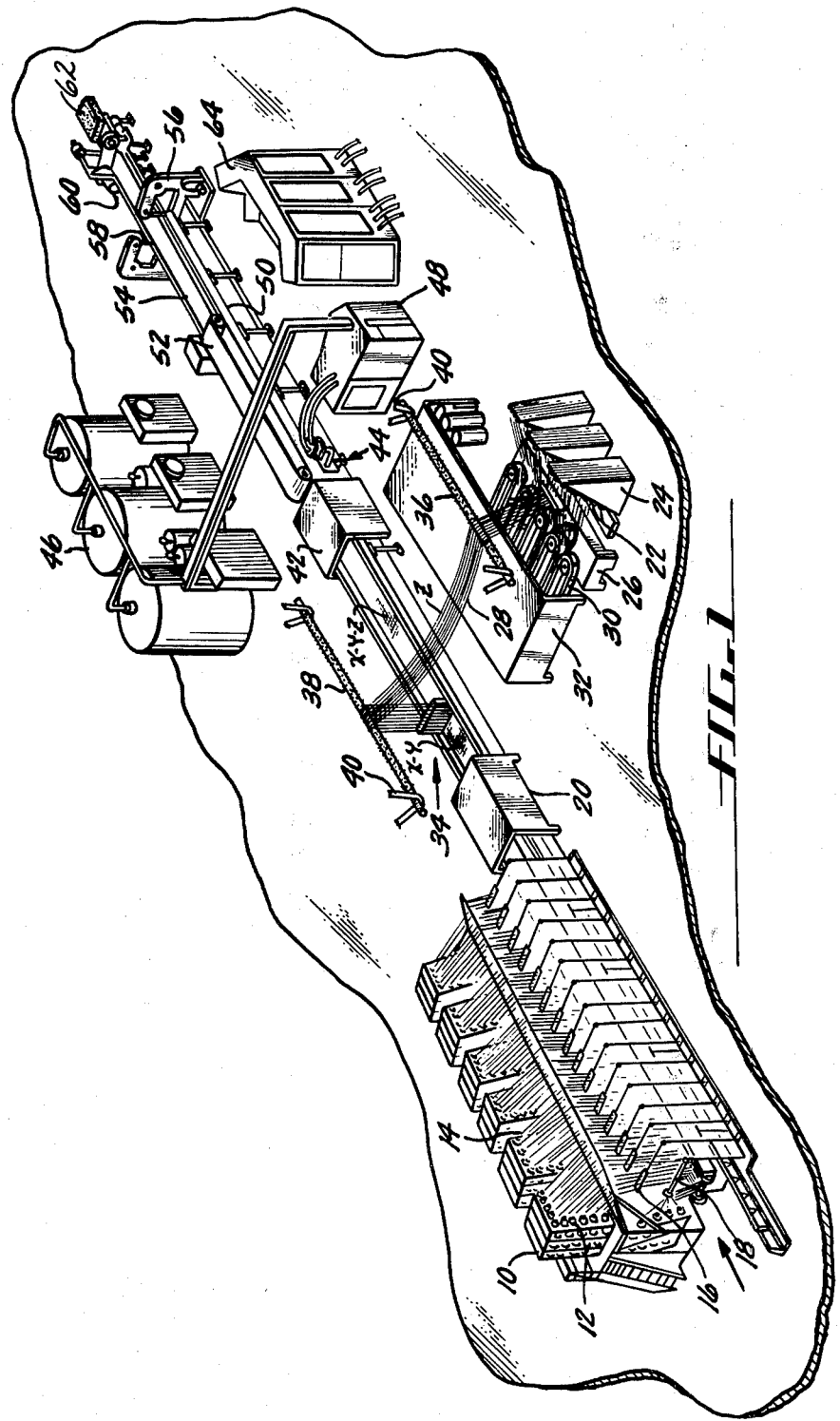
FIG. 1 is a simplified schematic, perspective illustration showing the present apparatus used for making continuous 3D reinforced foam insulation.

One form of apparatus used in making three-dimensional reinforced insulation material is shown in FIG. 1. The X-Y array is made first, then the Z fibers are added to the matrix. Thereafter, the foaming operation is performed, followed by curing and cutting. The apparatus in FIG. 1 will be explained in that order. Here there is shown banks 10 of spools 12 on which are wound fibers 14 which are used in making the X-Y grids. As each spool is emptied, it is replaced and the fibers from the new spool joined to the end of the old spool fibers to form a continuous, endless strand. X fibers are fed through X feed stations 16 of which there is a station for each layer of grid of X fibers in the array. At this station the X fibers are spaced laterally across the desired width of the plank to be formed to provide a longitudinal plane of fibers. For a six inch thick array with ⅜ inch spacing, 17 such stations are used. For a 24 inch wide array with ⅜ inch spacing, 65 strands are fed into each station. Thus, 1105 spools 12 are in continuous use for making the X fibers in the array. The dimensions above noted are typical but not limiting upon the practice of this invention.

Each layer of Y fibers in the array also has a Y fiber feed station 18. For a six inch thick array 17 spools are needed, one for each layer of Y fibers. The Y fibers are fed back and forth across the width of the array and are hooked or looped over moving pegs or hooks on the sides, this structure to be hereinafter more fully described. The first X-Y stations 16, 18, make the lowermost layer, the second stations make the next higher, the third stations make the next higher, etc., with the last stations making the uppermost layer.

The vertically stacked X-Y array next passes along a pathway through an X-Y bonding station 20 where the X-Y fiber cross-overs are bonded. This may be done by spraying them with a resin and heating or by bonding the impregnated or pre-impregnated filamentary material of the fibers in any number of well known methods. Simply heating to about 180° F. for 10 to 15 seconds usually is sufficient for this purpose.

The vertical Z fibers which protrude through the vertically spaced X-Y squares require 64 spools 22 from Z spool bank 24, based upon the insertion of one fiber into each square and further based upon insertion in one laterally extending row of squares at a time. Each row of squares receiving Z fibers at the same time requires a separate Z insertion station fed from 64 spools of filament material. In this illustrative embodiment, where four strands are used to make a string of Z fiber segments for insertion into each square, four times that number of spools is required.

From Z bank 24 the strands pass through a Z fiber fabrication station 26 where four spaced strands of resin-impregnated glass filaments are squeezed and bonded together at predetermined spaced intervals, forming a continuous chain of alternate grouped and spaced segments or bundles, of strands. After forming, these segments 28 are held in place between endless belts 30 and passed through a Z fiber curing station 32 where the segments become stiff with cured resin. One method of forming such segments is explained more fully hereinafter when reference is had to FIG. 3.

From the curing station 32 the chains of Z segments 28 are fed to a Z fiber insertion station 34 which is positioned downstream from the X-Y array bonding station 20. In the embodiment shown these segments 28 pass overhead over rollers 36, 38 mounted on brackets 40 suspended from the ceiling, not shown. At the Z fiber insertion station 34 the segments 28 are fed into the vertical square columns of the X-Y array and cut from its chain so the next segment can be inserted into the next column. This operation will be more fully described hereinafter with reference to FIG. 7.

As the X-Y columns are filled with Z fibers, the array moves through an X-Y-Z bonding station 42 where the contacting portions of the Z fibers are bonded to the X-Y fibers to complete the array. This may be done in a manner similar to that performed at bonding station 20. In some cases the bonding of the Z fibers to the X-Y array has been found to be an unnecessary step. In others the bonding is preferable. In any event, when the X-Y-Z array passes from bonding station 42 it is ready for the foaming and encapsulation operation.

At foaming station 44, suitable chemicals for producing a foam insulation are applied to the array. These chemicals may be the insulative material in liquid form, an activator to cause solidification, and a blowing agent to cause the material to foam up through the array before solidification occurs. Polyurethane, appropriate catalyst and a Freon gas are examples of such chemicals. These chemicals are pumped from supply tanks 46, through control station 48 and onto a moving belt 50 which moves at the same rate as the fiber array. The urethane or equivalent foam material foams up through the array. An endless belt 52 is positioned above the array to prevent the foam moving the array upwardly as it passes through the array. It also limits upward expansion of the foam beyond the limits of the array which it encapsulates. Both belts 50 and 52 are of such length that they support the moving foamed array until the foam has solidified and cured sufficiently for cutting and further handling. Curing is a function of time with most of the chemicals used.

After sufficient curing, the foamed array 54 is then separated from its supports such as side frames to which the Y fibers were attached (shown in FIG. 2), and the belt 50 on which it has been carried. Band saws 56 with blades 58 trim the sides and saw 60 cuts the reinforced foam insulation into planks 62 of desired length. These planks may then be wrapped or packaged if desired prior to subsequent curing or handling. The frames and belts used in moving the array and insulation material are cleaned and returned to the initial portion of the machine for reuse. The entire system may be automated with an operator at control station 64 coordinating the various operations for continuous output flow. Continuous non-stop movement of the array and foam material is the preferred mode, according to the present invention.

Figure 2:
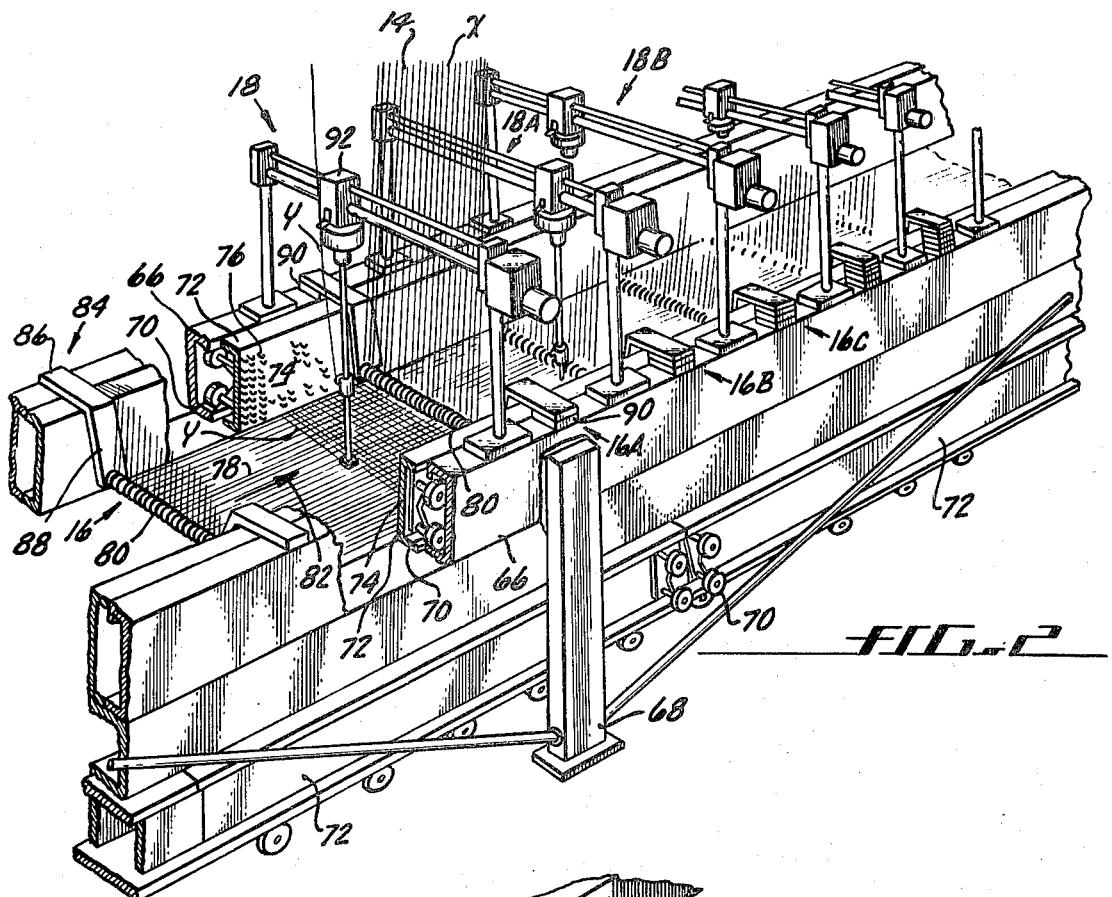
FIG. 2 is an enlarged, fragmentary, partially schematic perspective illustration of the apparatus used in making stacked X-Y filament grids.

Certain parts of the apparatus in FIG. 1 will now be explained in greater detail. In FIG. 2 there is shown a portion of the X-Y array fabrication apparatus. Here elevated guides 66 extend horizontally between supports 68. These guides are C-shaped channels which receive rollers 70 on side frames 72. These side frames 72 are spaced apart so that multiple layers of spaced X oriented fibers may pass between and parallel to the side frames. These side frames 72 have opposed vertical faces 74 on which are mounted vertically spaced horizontal rows of tenter hooks 76. In one embodiment the horizontal row are ⅜ inch apart and the hooks are ⅜ inch apart in each row. These hooks extend inwardly to receive the transverse Y strands that pass from side frame to side frame in forming multiple layers of spaced Y oriented fibers for the X-Y array.

The first or lowermost layer of spaced X fibers 78, from the spools 12 in FIG. 1, are spaced across the width of the array and pass under guides 80 at X feed station 16 to move in a longitudinal direction shown by arrow 82. Guides 80 extend across the width of the array and are mounted on guides 66 by means of L-shaped brackets 84 having a support plate 86 and downwardly extending leg 88. This structure is identical at each of the X feed stations 16. However, the next X station 16A is raised ⅜ inch to provide a second layer of X fibers ⅜ inch above the first layer. This is accomplished by placing a ⅜ inch block 90 under support plate 86 at this station. Subsequent X feed stations 16B, 16C, etc., are also raised with additional blocks until the desired thickness or number of layers in the array is achieved. Thicker or thinner blocks may be used to vary the vertical spacing as desired.

The Y feed stations 18 are mounted on guides 66. A feeder mechanism 92 moves transversely between the side frames 72 to lace a Y strand between tenter hooks 76 on each side of the array. Each feed station laces the hooks on a selected plane, starting with the lowermost in the X-Y array. The next Y feed station 18A laces Y strands in the next higher layer and the following feed station 18B laces Y strands in the next higher plane. The number of stations used depends upon the number of Y fiber layers desired in the array.

Figure 3:
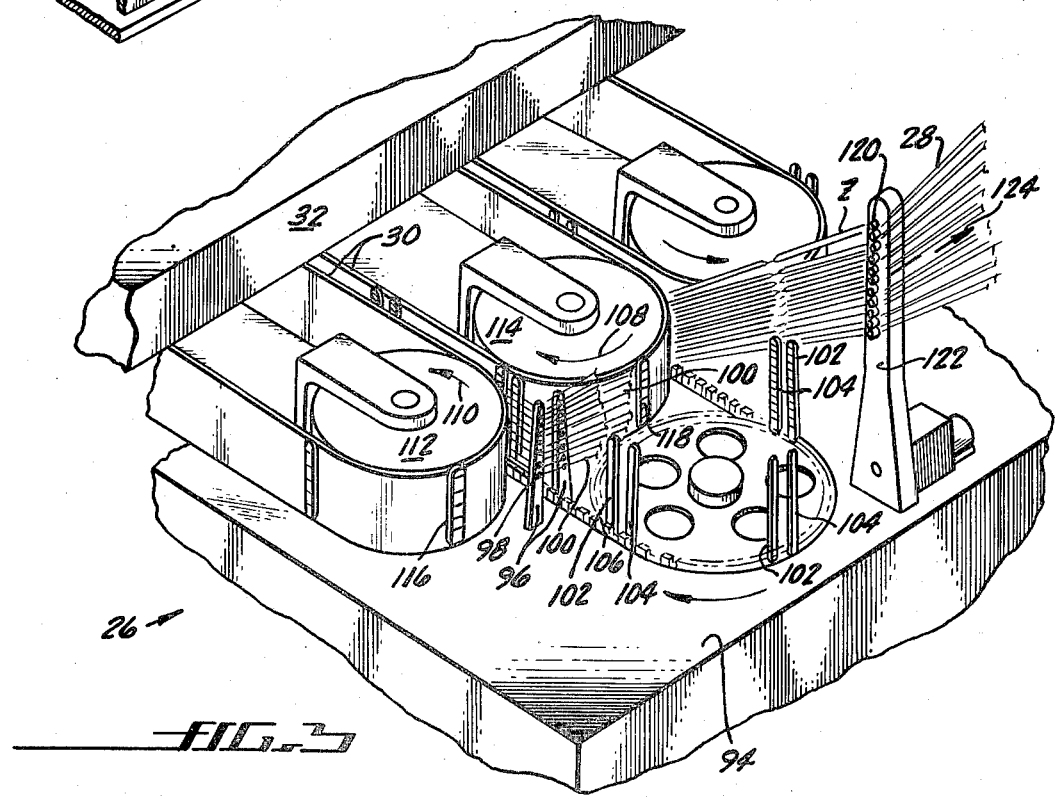
FIG. 3 is a further enlarged perspective illustration of apparatus used in arraying one form of continuous Z strands.

FIG. 3 illustrates one form of mechanism that may be used to make Z segments of the type shown in FIG. 6. These are lengths of initially parallel strands of filaments brought together at spaced intervals to form alternate grouped and spaced segments or bundles of strands. Each bundle is inserted into the vertically spaced squares formed by X-Y fiber intersections in each layer of the array. One form of apparatus for doing this is shown in FIG. 7, to be described hereinafter.

Referring now to FIG. 3 the Z fiber fabrication station 26 includes a table or bench 94 having two spaced upstanding guides 96 mounted thereon. These guides have a plurality of apertures 98 through which Z fibers pass to set up two vertical planes 100 of spaced fibers. Vertical spacers 102, 104 on an endless belt 106 pass between the vertical planes of fibers to maintain their spaced relationship, except at spaced intervals wherein two fibers from one plane are joined together with two fibers from the other to make a segment of four strands.

The two vertical planes 100 of fibers pass between a pair of endless belts 30. The belts are counterrotating as shown by arrows 108, 110 on rollers 112, 114. These belts have a plurality of opposed gripping bars 116, 118 mounted thereon. The purpose of the opposed gripping bars 116, 118 is that when they come together where their carrier belts 30 are parallel, they squeeze the parallel planes 100 of fibers together at their points of contact. This squeezing together occurs between spacers 102, 104 which keep the planes 100 of fibers spaced apart except where the gripping bars 116, 118 squeeze them together. This will be more fully explained when reference is had to FIGS. 4 and 5.

As the planes 100 of fibers pass between endless belts 30 they pass into the Z fiber cure station 32 where the contacting fibers are bonded together. As the Z segments are returned from the cure station 32 they pass upwardly, over rollers 120 on support 122 on table 94. This separates them from spacers 102, 104 between which fibers from the two planes 100 had been bonded. From rollers 120 the Z segments 28 move in the direction of arrow 124 to the Z fiber insertion station 34 in FIG. 1 which will be more fully described hereinafter when reference is had to FIG. 7.

Reference is now made to FIGS. 4, 5 and 6 for a further explanation as to how the Z segments 28 are formed. Although many strings of these segments are made at the same time with the apparatus in FIG. 3, only one string is made with the gripping bars 116, 118 shown in FIGS. 4 and 5. In FIG. 4 rollers 112, 114 rotate counter to each other as shown by arrows 110, 112 to bring gripping bars 116, 118 on spaced belts 30 together. Bar 116 has spaced side plates 126 which receive bar 118 in between, as shown in FIG. 5, when that portion of belts 30 are moving in spaced parallel relationship toward the curing station 32, shown in FIG. 3. Side plates 126 have notches defined by edges 128 which capture two fibers 130 from one of the vertical planes 100 of Z fibers, shown in FIG. 3. As roller 112 rotates, fibers 130 ride along edges 128 to their apex 132. Gripping bar 118 also has tapered surfaces 134 which terminate in apex 136. As roller 114 rotates, the tapered surfaces 134 capture two fibers 138 which ride the surfaces to apex 136. As shown in FIG. 5, apex 132 on bar 116 and apex 136 on bar 118 coincide to press all four fibers into contact with each other. This contact area is identified by numeral 140 in FIG. 6. Spacers 102 and 104 have horizontal ridges or grooves 142 on their sides, shown in FIG. 5, to keep the fibers 130, and 138, spaced and parallel to provide four fiber segments 28. These spacers are indicated by dashed lines in FIG. 6 to show their relationship with the Z segments 28 and the contact area 140 between them.

The Z fiber insert station 34 in FIG. 1 is partially shown in FIG. 7 with the X-Y array shown below it. A plurality of rectangular guides 144 is positioned with a guide over each X-Y square across the width of the array. A 24 inch wide array with ⅜ inch openings has a row of 64 guides. A string of Z segments 28 feeds through each guide and a Z segment is pushed into each X-Y square in its row as the square moves past the guide. After the Z segment has been inserted, it is cut from the string by cutting means 146.

The apparatus for pushing Z segments 28 into the X-Y array includes an endless belt 148 rotated by powered roller 150. Attached to this belt are spaced mover rods 152 extending horizontally. Each guide has a vertical slot 154 through which a finger 156 on each rod 152 extends to engage a Z segment. As belt 148 moves rod 152 downwardly, the fingers 156 move segments 28 downwardly. As the rods 152 pass around roller 150 the fingers 156 free themselves from the segments 28 which momentarily stop their downward movement to permit the lowermost segment to be severed and the X-Y array move forward for the next X-Y square to be filled.

In the preferred mode as previously noted, there is continuous non-stop movement of the X-Y and X-Y-Z array, and foam material. FIG. 7a shows the apparatus for moving the Z insertion mechanism at each Z fiber insertion station 34, described above, longitudinally at the same velocity as the X-Y array during the vertical Z insertion stroke for inserting the Z segments 28 into the X-Y array. The Z fiber insertion mechanism at 34 and described above is mounted on linear bearings 157 for limited slidable back and forth longitudinal movement on a horizontal rod 159 mounted at opposite ends on brackets 161 supported on the fixed member 66 on the machine frame. Such longitudinal back and forth movement is for a short distance in each direction.

Longitudinal reciprocating movement to the Z fiber mechanism at 34 is imparted by the rise and fall of the lobes 163 on a cam 165 which is actuated by a shaft 167 mounted on the machine frame 68, and a pinion gear 169, which in turn is driven from a rack 171 attached to each longitudinally movable side panel or frame 72.

The Z insertion mechanism at 34 is mounted for longitudinal motion in response to rotation of cam 165 by means of a pivotally mounted linkage 173, one arm 175 of which is pivotally connected at 177 to the rear of vertically supported member 179 of the Z insertion mechanism 34. Arm 175 is also pivotally mounted at 181 at its outer end to a second arm 183 of the linkage 173, arm 183 being in turn pivotally mounted at 185 intermediate its ends on the machine frame member 66. The lower end of arm 183 carriers a guide roller or cam follower 187 in contact with the periphery of cam 165.

The guide roller 187 is maintained in contact with the cam surface by means of a spring 189 connected at one end to a fixed bracket 191 and at its opposite end is connected at 193 to the lower end of support member 179 of the Z insertion mechanism 34, below the pivotal connection 177 of link arm 175 with support member 179. The spring 189 is biased in a direction urging the Z insertion mechanism 34 longitudinally to the left in FIG. 7a, thus maintaining guide roller 187 in contact with the periphery of cam 165, through the pivotal linkage 173.

Thus, as the side panel 72 advances the X-Y array to the right, viewing FIG. 7a, the gear rack 171 on the side panel turns the pinion gear 169, causing clockwise rotation of cam 165, and causing the Z insertion mechanism at 34 to advance in the same longitudinal direction as the X-Y array. Cam 165 is designed so that such longitudinal movement of the Z insertion mechanism is at the same velocity as the X-Y array is moving, as the roller 187 moves to the adjacent lobe or high spot 163 on the cam. Accordingly, there is no relative longitudinal movement between the Z fiber groups 28 and the X-Y array during Z fiber filament insertion into one row of openings in the X-Y array, and cut-off, as described above. As the cam continues to rotate clockwise, the roller 187 moves to the low portion 195 of cam 165, causing the spring 189 to quickly retract the Z insertion mechanism to the left, viewing FIG. 7a, thus returning the Z insertion mechanism at 34 to its original longitudinal position or station for the start of the next Z fiber insertion cycle for inserting the Z fibers into the next row of openings in the X-Y array. With ⅜" openings provided by each X-Y square across the width of the X-Y array, the Z insertion mechanism would be retracted approximately ⅜" each time for the start of successive Z fiber insertion cycles in order to fill all of the X-Y squares of the array with Z fibers, when a single Z fiber insertion mechanism is employed. Hence, the Z fibers or filaments are thus inserted into the continuously moving X-Y array "on the fly."

Although it is possible to insert Z filaments into the X-Y array while the X-Y array is moving relative to the Z insertion mechanism at 34 in the continuous machine by having the vertical Z insertion velocity high relative to the longitudinal array speed, increased reliability of Z fiber insertion is obtained by moving the Z insertion mechanism longitudinally at the same velocity as the X-Y array during the vertical Z fiber insertion stroke, as described above.

In preferred practice, two or more Z fiber insertion devices similar to those shown in FIGS. 7 and 7a are utilized, suitably longitudinally spaced along the machine. If two such devices are used, the first device or unit would be located so as to install all odd numbered rows of Z fibers into the X-Y array, and the second unit located so as to install all even numbered rows of Z fibers into the X-Y array. If three Z fiber inserter units are used, they would be spaced longitudinally along the machine so that the first unit would install all Z fibers into rows 1, 4, 7, 10 etc., of the X-Y array; the second unit, rows 2, 5, 8, 11, etc., of the X-Y array; and the third unit, rows 3, 6, 9, 12, etc. of the X-Y array.

FIG. 8 is a fragmentary isometric view of a Z segment inserted in an X-Y array. In this illustration only two vertically spaced X-Y squares are shown. A Z segment 28 is shown, partially in phantom lines, extending through the array. Each of the Z strands parallel legs 158, 160, 162, 164 are in the intersecting corners of the X-Y fibers and may be bonded readily to these corners, if desired. The upper and lower portions, shown in phantom lines, tapering and terminating in the upper and lower contact areas 140 are cut and removed after the foaming operation has been completed and the foam insulation partially cured. Preferably these ends are exposed beyond the foam so that they might be bonded to adjacent slabs of insulation, liner faces or tank or hull structure.

Adjacent Z segments are inserted into adjacent X-Y squares with their Z strand parallel legs also extending between X-Y layers at their corners of intersection. Thus it can be seen that each intersecting corner has four Z fibers contacting it. This provides excellent tensile strength throughout the thickness of the insulation, resisting rupture in the event of leakage of liquid natural gas into the foam.

While certain exemplary embodiments of this invention have been described above and shown in the accompanying drawings, it is to be understood that such embodiments are merely illustrative of, and not restrictive on, the broad invention and that we do not desire to be limited in our invention to the specific dimensions, constructions or arrangements shown and described since various other obvious modifications may occur to persons having ordinary skill in the art.

What is claimed is:

1. Apparatus for continuously forming three-dimensional filament reinforced foam insulation, comprising means for extending a plurality of continuous first layers of spaced X fibers in a longitudinal direction, said first layers being spaced vertically from each other, means for extending a plurality of second layers of spaced Y fibers in a transverse direction, said second layers being spaced vertically from each other, and forming an X-Y array, means operatively associated with both of said extending means, for continuously moving said layers of X and Y fibers together in a path of travel in a longitudinal direction, means for inserting Z fibers through said layers to form an X-Y-Z array during said longitudinal movement of said layers of X and Y fibers, and means for foaming an insulation material through said array during continuous movement of said X-Y-Z array in a longitudinal direction.

2. Apparatus as defined in claim 1, said means for extending a plurality of second layers of spaced Y fibers in a transverse direction including side members positioned in a longitudinal direction and means for lacing said Y fibers between said opposite side members.

3. Apparatus as defined in claim 1, said means for inserting Z fibers through said layers of X and Y fibers including a Z fiber insertion device for inserting one row of Z fibers into said X-Y array, means for advancing said device in a longitudinal direction at the same velocity as said X-Y array during said insertion of said row of Z fibers into said X-Y array, and means for retracting said device longitudinally for similarly inserting another row of Z fibers into said X-Y array.

4. Apparatus as defined in claim 3, including a plurality of said Z fiber insertion devices, said devices being spaced longitudinally along said X-Y array, the respective Z fiber insertion devices inserting alternate rows of Z fibers into said X-Y array.

5. Apparatus as defined in claim 3, said means for foaming an insulation material through said array including moving belt means positioned beneath the three-dimensional X-Y-Z array, means for synchronously moving said belt means in the same direction and at the same velocity as said X-Y-Z array and into close proximity thereto, and means for discharging the foam onto said moving belt means and permitting said foam to pass upwardly through said X-Y-Z array.

6. Apparatus as defined in claim 1, said means for foaming an insulation material through said array including moving belt means positioned beneath the three-dimensional X-Y-Z array, means for synchronously moving said belt means in the same direction and at the same velocity as said X-Y-Z array and into close proximity thereto, and means for discharging the foam onto said moving belt means and permitting said foam to pass upwardly through said X-Y-Z array.

* * * * *